United States Patent [19]

Tang et al.

[11] Patent Number: 5,784,333
[45] Date of Patent: Jul. 21, 1998

[54] METHOD FOR ESTIMATING PERMEABILITY OF EARTH FORMATIONS BY PROCESSING STONELEY WAVES FROM AN ACOUSTIC WELLBORE LOGGING INSTRUMENT

[75] Inventors: Xiaoming Tang, Sugar Land; Stephan Gelinsky, Houston; Raghu K. Chunduru, Webster; Arthur C. H. Cheng, Houston, all of Tex.

[73] Assignee: Western Atlas International, Inc., Houston, Tex.

[21] Appl. No.: 861,263

[22] Filed: May 21, 1997

[51] Int. Cl.$^6$ .............................. G01V 1/40; E21B 49/00
[52] U.S. Cl. .............................. 367/30; 367/32; 364/422; 166/250.02; 73/152.05
[58] Field of Search .............................. 367/131, 30, 32, 367/35; 364/422; 166/250.02, 252.5; 73/152.05, 152.58

[56] References Cited

U.S. PATENT DOCUMENTS

| | | | |
|---|---|---|---|
| 4,797,859 | 1/1989 | Hainby | 367/31 |
| 4,888,740 | 12/1989 | Brie et al. | 367/30 |
| 5,616,840 | 4/1997 | Tang | 73/152.05 |
| 5,687,138 | 11/1997 | Kimball et al. | 73/152.05 |

OTHER PUBLICATIONS

Tang et al, J. Acoust. Soc. Am., vol. 30, #3, Sep. 1991 pp. 1632–1646.
Williams et al, SPWLA 25th Symp., Jun. 13, 1984, pp. 1–13.
Tang et al, Gephysics, vol. 61, #3, pp. 639–645, May 1996; Abstract only herewith.
Tang et al, 63rd Annu. SRG Lat. Mtg. Sep. 30, 1993, pp. 80–83; Abst. only herewith.
Rosenbaum, J.; *Synthetic Microseismograms: Logging in Porous Formations*, Geophysics, vol. 39, pp. 14–32, Society of Exploration Geophysicists (1974).

Williams, D. et al.; *The Long Spaced Acoustic Logging Tool*, Transactions of the 25th Annual Logging Symposium, Society of Professional Well Log Analysts (1984).

Winkler, K. et al.; *Permeability and Borehole Stoneley Waves: Comparison Between Experiment and Theory*, Geophysics, vol. 54, pp. 66–75, Society of Exploration Geophysicists (1989).

Burns, D.R. et al; *Permeability Estimating From Full Waveform Acoustic Logging Data*, The Log Analyst, vol. 29, pp. 112–122, Society of Professional Well Log Analysts, Houston, TX (1988).

Tang, X.M. et al.: *Dynamic Permeability and Borehole Stoneley Waves: A Simplified Biot–Rosenbaum Model*, Journal of the Acoustic Society of America, vol. 90, pp. 1632–1646 (1991).

Johnson, D.L. et al.; *Theory of Dynamic Permeability and Tortuosity in Fluid–Saturated Porous Media*, Journal of Fluid Mechanics, vol. 176, pp. 379–400 (1987).

*Primary Examiner*—Nelson Moskowitz
*Attorney, Agent, or Firm*—Richard A. Fagin

[57] ABSTRACT

A method for determining the permeability of earth formations penetrated by a wellbore from acoustic signals measured by an acoustic wellbore logging instrument. The method includes separating components from the measured acoustic signals which represent Stoneley waves propagating through the earth formations. Signals representing Stoneley waves propagating through the same earth formations are synthesized. The separated acoustic signal components and the synthesized Stoneley wave signals are compared. The permeability is determined from differences between the synthesized Stoneley wave signals and the separated acoustic signal components. In a preferred embodiment, the step of calculating the permeability includes inversion processing a wave center frequency shift and a wave travel time delay with respect to the permeability of the earth formations.

21 Claims, 6 Drawing Sheets

Fig. 1
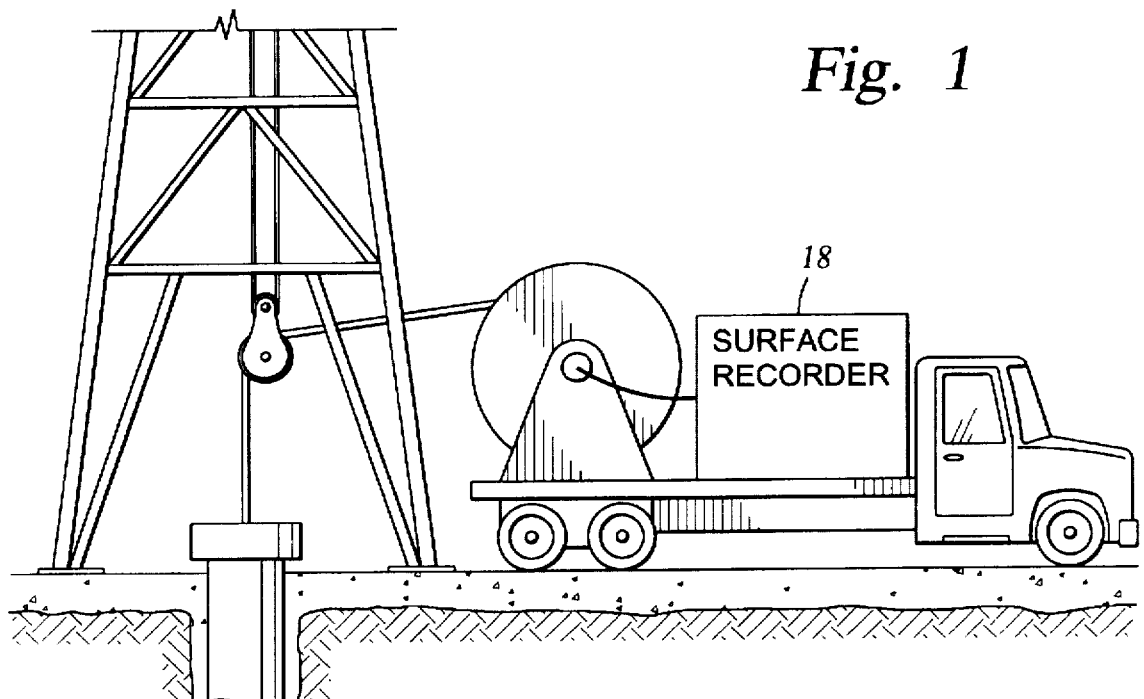
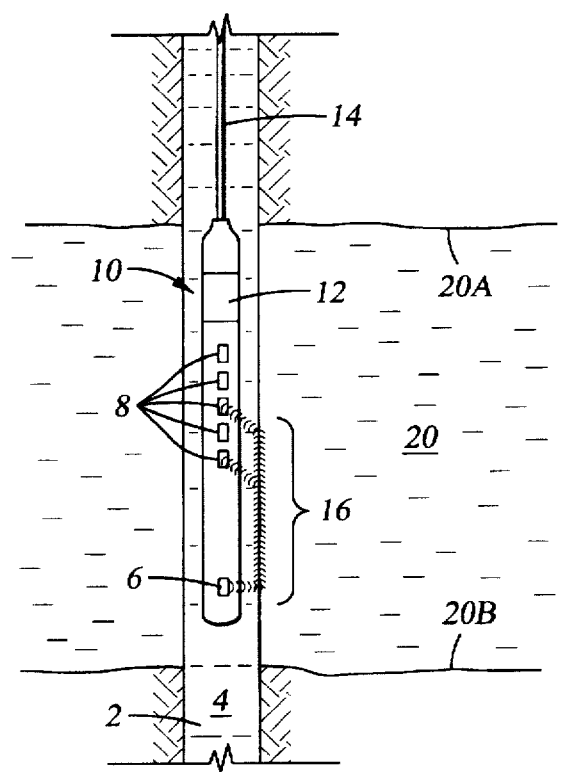

METHOD FOR ESTIMATING PERMEABILITY OF EARTH FORMATIONS BY PROCESSING STONELEY WAVES FROM AN ACOUSTIC WELLBORE LOGGING INSTRUMENT

BACKGROUND OF THE INVENTION

1. Field of the Invention

The invention is related to the field of acoustic wellbore logging. More specifically, the invention is related to methods for determining the permeability to fluid flow of earth formations by processing signals recorded by an acoustic wellbore logging instrument.

2. Description of the Related Art

Acoustic wellbore logging instruments are used to measure velocities of earth formations in one or more modes of acoustic energy propagation. Acoustic wellbore logging instruments are typically used in liquid-filled wellbores drilled through the earth formations. Velocity is generally determined using these instrument by measuring the time taken by an acoustic energy pulse to traverse a particular distance along the wall of the wellbore. The wall forms the interface between the liquid in the wellbore and the earth formations.

One form of acoustic energy pulses of particular interest to the invention is referred to as "Stoneley" waves. Stoneley waves, also known as tube waves, are essentially guided pressure pulses travelling in the wellbore. It had been determined in earlier research that a relationship is likely to exist between the transmission properties of Stoneley waves as they propagate along the wellbore, and the hydraulic characteristics of the formations along the wellbore wall. See for example, J. Rosenbaum, *Synthetic Microseismograms: Logging in Porous Formations*, Geophysics, vol. 39, pp. 14–32, Society of Exploration Geophysicists (1974). Determining formation permeability was not practical using the acoustic logging instruments available at the time the Rosenbaum reference was published because those instruments typically did not generate detectable Stoneley waves, and in the instances where they did so, separation of the Stoneley waves from the acoustic signals as detected was very difficult.

It was later shown to be possible to more reliably detect Stoneley waves generated by an acoustic well logging instrument. See for example, D. Williams et al, *The Long Spaced Acoustic Logging Tool*, paper "T", transactions of the 25th annual logging symposium, Society of Professional Well Log Analysts (1984). Verification of the theoretical relationship between Stoneley wave propagation and permeability proposed by Rosenbaum, supra, was then performed by laboratory experiment. See for example, K. Winkler et al, *Permeability and Borehole Stoneley Waves: Comparison Between Experiment and Theory*, Geophysics, vol. 54, pp. 66–75, Society of Exploration Geophysicists (1989). This theoretical model was also used to estimate permeability from acoustic well log data. See for example, D. R. Burns et al, *Permeability Estimation from Full Waveform Acoustic Logging Data*, The Log Analyst, vol. 29, pp. 112–122 Society of Professional Well Log Analysts, Houston, Tex. (1988).

In practice, the method used by Burns et al included estimation of the velocity and attenuation dispersion of Stoneley waves in permeable formations, and inverting the velocity and attenuation dispersion to obtain permeability using the relationship described by Rosenbaum, supra. The method described by Winkler et al was impractical and difficult to perform because of the number of unknown parameters, such as the wellbore diameter along the wave propagation path, and reflection coefficients at boundaries between different layers of the earth formations.

A simpler parametric model for estimating permeability from Stoneley wave propagation was developed by Tang et al. See, for example, X. M. Tang et al, *Dynamic Permeability and Borehole Stoneley Waves: A Simplified Biot-Rosenbaum Model*, Journal of the Acoustic Society of America, vol. 90, pp. 1632–1646 (1991). The model described by Tang et al separates propagation of Stoneley waves into an "elastic" (or non-permeability related) component, and a "permeable" component. The elastic component is well known in the art. The permeable component could be calculated using a model developed by Johnson et al. See for example, D. L. Johnson et al, *Theory of Dynamic Permeability and Tortuosity in Fluid-Saturated Porous Media*, Journal of Fluid Mechanics, vol. 176, pp. 379–400 (1987). Without more, the Tang et al model using the Johnson et al method for determining the permeable component has proven impractical because it is difficult to separate the permeable and elastic components of the Stoneley waves.

Another difficulty in determining formation permeability from Stoneley waves has been separation of reflected from directly transmitted Stoneley waves in the acoustic signals. Interference between transmitted and reflected waves obscures the true amplitude of the directly transmitted Stoneley wave.

SUMMARY OF THE INVENTION

The invention is a method for determining the permeability of earth formations penetrated by a wellbore from measurements made by an acoustic wellbore logging instrument. The method includes separating components of the acoustic measurements which represent Stoneley waves propagating directly through the earth formations. Stoneley waves are then synthesized using as parameters the elastic properties of the earth formations, and measurements of the wellbore diameter. The separated, directly propagated Stoneley wave components are then compared to the synthesized Stoneley waves to extract non-permeability related propagation effects from the Stoneley wave components measured by the instrument. The permeability is calculated from the difference between the permeability related propagation effects in the separated components of the Stoneley waves measured by the instrument, and the synthetic Stoneley waves.

In a preferred embodiment of the invention, the permeability is determined by inversion processing the Stoneley center frequency shift and travel time delay with respect to the permeability.

BRIEF DESCRIPTION OF THE DRAWINGS

FIG. 1 shows an acoustic well logging instrument as it is used to acquire signals useful with the method of this invention.

DESCRIPTION OF THE PREFERRED EMBODIMENT

FIG. 1 shows an acoustic well logging instrument as it is used to acquire signals suitable for processing according to the method of this invention. The instrument 10 is inserted into a wellbore 2 drilled through earth formations 20. The instrument 10 can be inserted into and withdrawn from the wellbore 2 by means of an armored electrical cable 14 spooled from a winch (not shown) or any similar conveyance known in the art.

Figure 6:
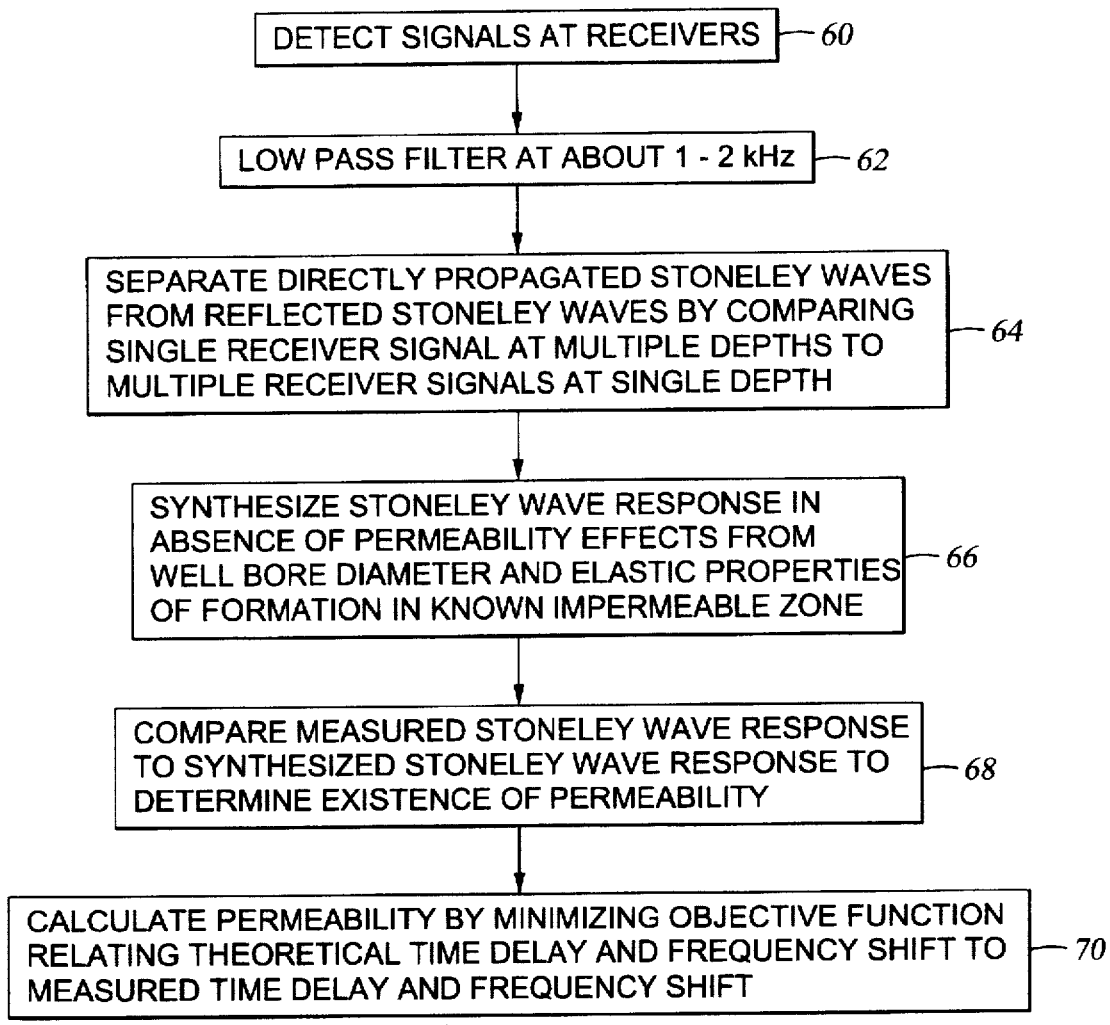
FIG. 6 is a flow chart of the method for determining permeability according to the invention.

The wellbore 2 is typically filled with a liquid 4, which can be "drilling mud" or any similar fluid usually used for drilling or completion of wellbores. The instrument includes an acoustic transmitter 6 and one or more acoustic receivers, shown generally at 8. The transmitter 6 is periodically energized and emits acoustic energy, shown generally as waves 16, which travel through the liquid 4, along the wall of the wellbore 2, and eventually reach the receivers 8. The receivers 8 generate electrical signals in response to the detected acoustic energy. This is shown in the flow chart in FIG. 6 at 60. The instrument 10 typically includes a telemetry module, shown generally at 12, which converts the electrical signals from the receivers 8 into a form suitable for recording and transmission over the cable 14 to a surface recorder 18. It should be understood that the number of receivers 8 and transmitters 6 as shown in FIG. 1 is only an example and is not meant to limit the invention.

Several different types of transmitters 6 and receivers 8 are known in the art, some of which generate and detect primarily flexural energy, and others which generate and detect primarily compressional energy. The type of transmitter and receiver used is not meant to limit the invention. It is only necessary that the transmitters and receivers be capable of generating and detecting acoustic energy within a frequency range of about 1–2 KHz. Preferably, compressional transmitters and receivers which include 1–2 KHz within their bandwidths should be used, since the compressional mode of acoustic energy transmission is likely to generate detectable Stoneley waves.

It should also be understood that the method of the invention can be performed at any location where there is a suitable computer (not shown). The method of the invention can be performed in the surface recorder 18 if appropriately programmed, but this is not meant to limit the invention.

1. Separation of Directly Propagated Stoneley Waves From the Received Signals

The first step in the method of the invention is to separate various components of the signals detected by the receivers 8 so that Stoneley wave components having a particular travel path through the earth formations can be identified and processed. Typically, Stoneley waves will have substantially all of their energy within a frequency range of about 1–2 KHz. The signals from the receivers 8 should first be filtered to exclude energy at frequencies above this range. Filtering will remove other propagation mode components such as compressional and shear modes. The filtered signals will then consist substantially entirely of Stoneley wave components. This is shown on the flow chart in FIG. 6 at 62.

The next step in the process of separating the Stoneley wave components is to identify the Stoneley wave components which represent wave propagation along the particular travel path. In the example of FIG. 1, there are three likely travel paths for the Stoneley waves. Some of the Stoneley waves travel along the wellbore as shown at 16. Other Stoneley waves can travel downwardly from the transmitter 6, and reflect from a boundary 20B between layers of the earth formations 20 having different acoustic impedances. The reflected waves will generally be detected at later times by the receivers 8, and can mix with later portions of the directly propagated waves. Other Stoneley waves can travel upwardly and reflect from another boundary, such as shown at 20A, and be detected by the receivers 8.

Figure 2:
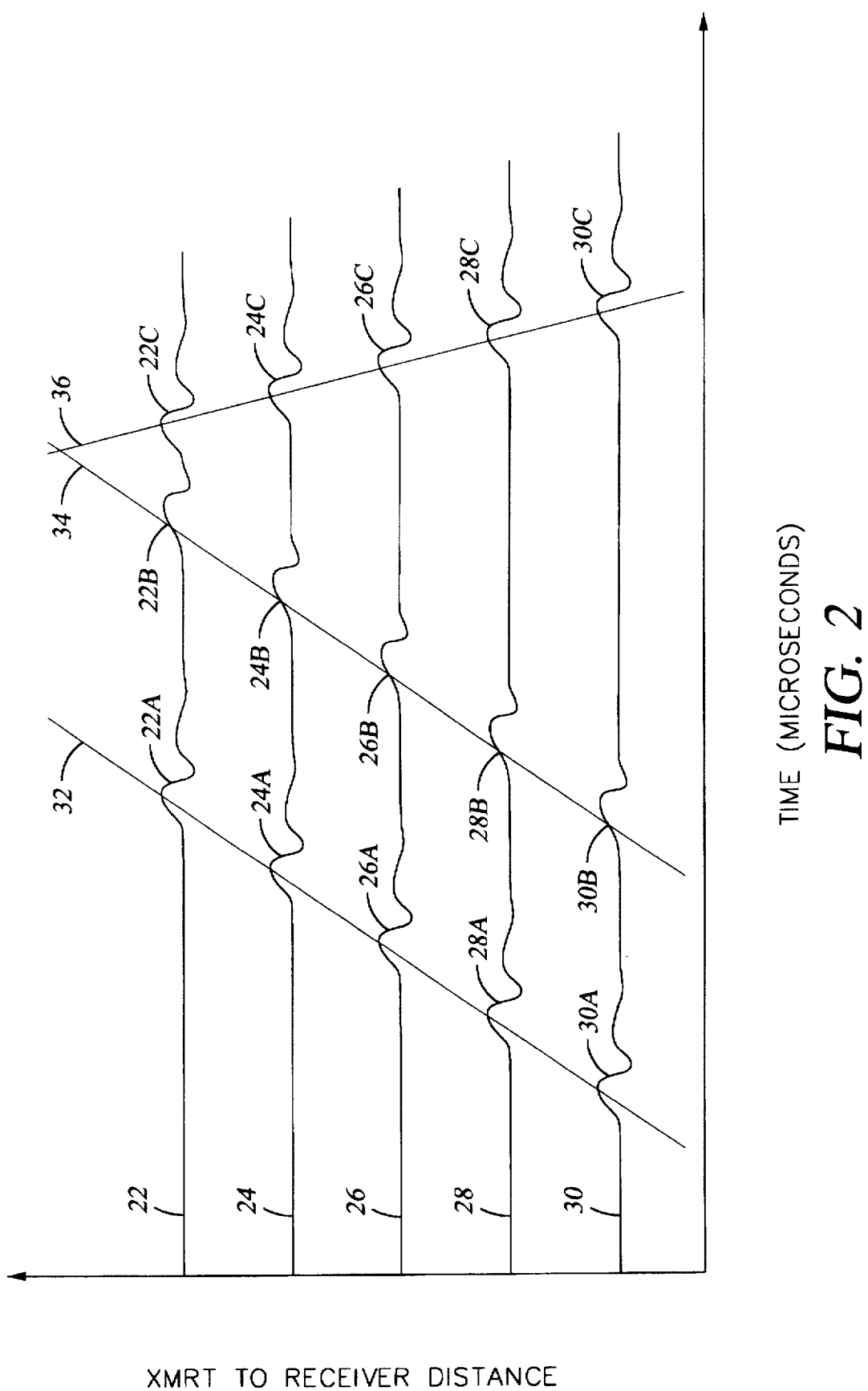
FIG. 2 shows a graph of signals received at each one of the receivers on the acoustic logging instrument of FIG. 1.

Referring now to FIG. 2, the process by which the various travel path components of the Stoneley waves are separated from the filtered signals will be explained. The graph in FIG. 2 represents the filtered signals, shown as curves 22, 24, 26, 28 and 30, from each one of the receivers (8 in FIG. 1) on the instrument (10 in FIG. 1) which were measured at a single axial instrument position (depth) in the wellbore (2 in FIG. 1). As can be inferred from the individual curves 22–30, events in each curve corresponding to propagation of Stoneley waves along one or more transmission paths can be identified. These events occur in each signal at a time which varies with respect to the distance between the individual receiver and the transmitter, the amount of variation with respect to transmitter-to-receiver distance corresponds to the inverse of the propagation velocity ("slowness") of the Stoneley waves along the wellbore.

For example, in each of curves 22–30, a first event shown at 22A–30A, can be observed. The first events 22A–30A typically correspond to the direct transmission of Stoneley waves along the wellbore wall from the transmitter to the receivers, and therefore have the shortest overall propagation time to any receiver. The first events 22A–30A will have a time variation with respect to the transmitter-to-receiver distance, called the "moveout" and shown at 32, which corresponds to the Stoneley wave slowness of the earth formations through which the Stoneley waves directly propagate.

Second events 22B–30B can be observed in each of the curves 22–30. The second events 22B–30B correspond to Stoneley waves which reflect from an acoustic impedance boundary located axially below the transmitter (for the instrument configuration as shown in FIG. 1), and are subsequently detected by the receivers. The second events 22B–30B have a moveout shown at 34 which represents substantially the same slowness as the moveout 32 for the first events 22A–30A because the reflected Stoneley waves travel through the same portion of the formation to each receiver as do the directly transmitted Stoneley waves. The first events 22A–30A and the second events 22B–30B are shown as being substantially time separated for clarity of the illustration in FIG. 2, but it should be noted that if a boundary is located axially proximal to the transmitter, there could be substantial interference between the first events 22A–30A and the second events 22B–30B. A process for separating the first events from the second events will be further explained.

Third events, shown generally at 22C–30C, can be caused by Stoneley waves being reflected from the boundary located axially above the instrument (as shown in the configuration of FIG. 1). The moveout 36 of the third events 22C–30C is typically opposite in direction to moveout of the first and second events. It can be readily seen how interference between first, second and third events can make it difficult to determine which part of the Stoneley waves result from direct transmission of the energy through the earth formations from the transmitter to the receivers.

Figure 3:
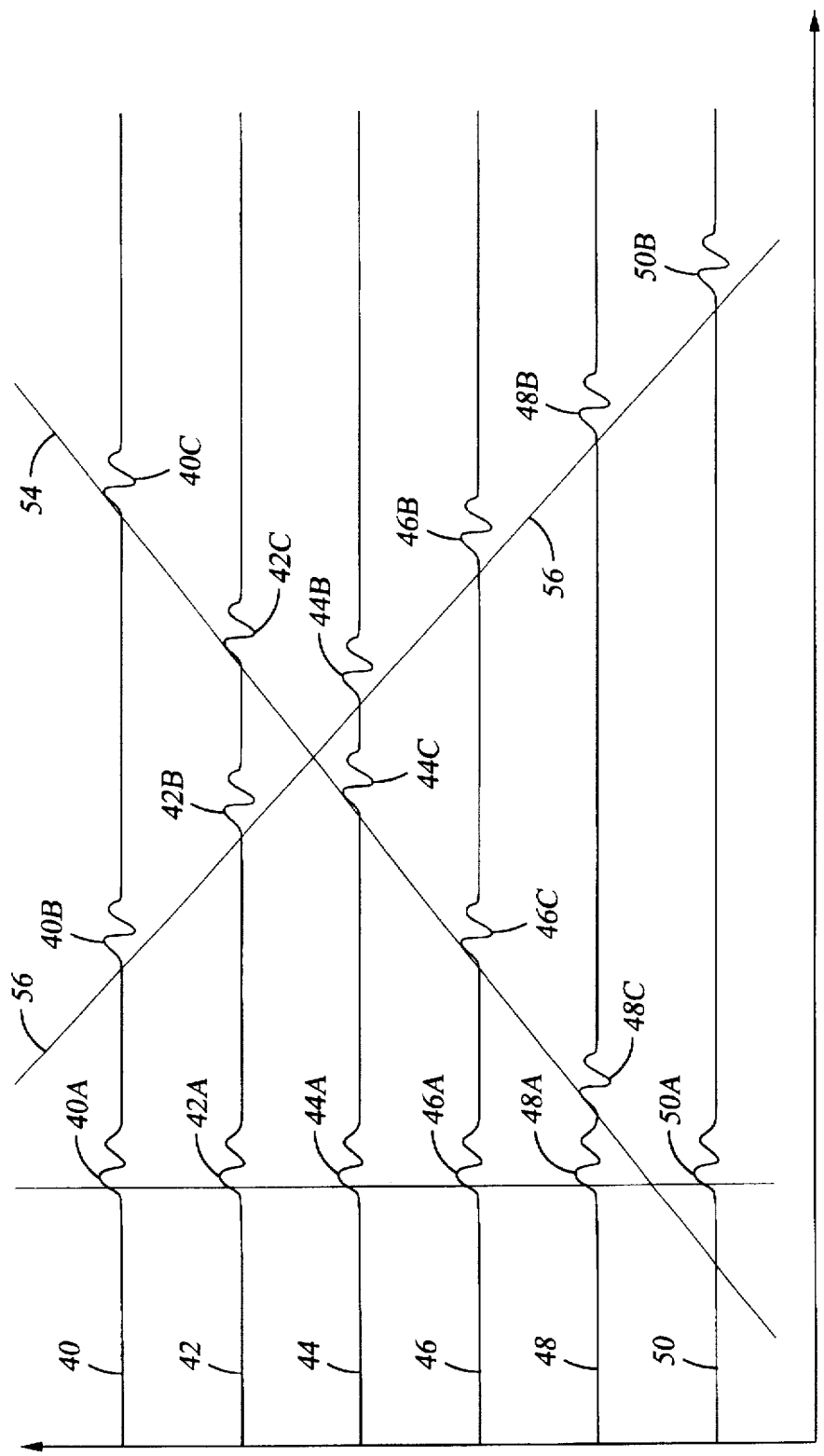
FIG. 3 shows a graph of signals received by one of the receivers on the instrument of FIG. 1 when the instrument is moved through the wellbore.

In the method of the invention, different components of the Stoneley waves resulting from wave propagation along different travel paths can be separated by selecting the signals from a single one of the receivers. This same wave mode separation can also be used with acoustic well logging instruments which only include one or two receivers, where an array graph such as shown in FIG. 2 would be impossible to construct. Referring now to FIG. 3, the signals from a single one of the receivers (8 in FIG. 1) are shown at 40–50 as being measured at a plurality of different axial (depth) positions of the instrument (10 in FIG. 1) within the wellbore (2 in FIG. 1). As a matter of convenience for the system designer, the axial (depth) separation between each one of the axial positions at which the signals were measured is about equal to the nominal sample interval between successive well log measurements. The nominal sample interval is typically ¼ to ½ foot. The number of individual signals which can be used should correspond to a total depth span about equal to the distance between the receiver nearest to, and the receiver farthest away from, the source (6 in FIG. 1) (this distance being referred to as the "array aperture"). For a typical acoustic array well logging instrument this can include about 8–12 individual signals representing a receiver array aperture of about 3½ feet.

As long as the Stoneley wave velocity does not substantially change in the formation located between the selected receiver and the source, the events such as shown at 40A–50A, which correspond to the directly propagated waves, will have substantially zero moveout as shown at 52, because the wave propagation path length does not substantially change as the instrument 10 is moved along the wellbore 2. Events corresponding to reflected waves, such as shown at 40B–50B for reflections from the boundary (such as 20A in FIG. 1) located above the instrument 10 will typically have a moveout 56 which corresponds to twice the slowness of the formation through which the Stoneley waves propagate. The moveout for reflected Stoneley waves is doubled relative to the moveout shown in the multiple-receiver signal graph in FIG. 2 because as the instrument 10 moves towards or away from a reflective boundary (such as 20A in FIG. 1), the total acoustic wave travel path between the source 6 and the particular receiver shortens at twice the rate of movement of the instrument 10. Events shown at 40C–50C correspond to Stoneley waves reflected from the boundary (20B in FIG. 1) below the instrument 10. The length of this wave travel path will increase at twice the rate of movement of the instrument, so the moveout of the reflected waves from the lower boundary 20B will typically represent twice the Stoneley wave slowness represented by the moveout shown in FIG. 2, and will have opposite sign with respect to the events 40B–50B representing the waves reflected from the upper boundary 20A.

The manner in which the Stoneley wave propagation modes can be separated from each other is explained as follows. A quantity p can represent the total number of individual wave propagation modes (such as the previously explained direct, upwardly reflected or downwardly reflected mode) present in the signals measured by an array (such as shown at 8 on the instrument 10 in FIG. 1) consisting of N equally spaced apart acoustic receivers. The receivers preferably have a uniform spacing between each of them represented by d. Each individual mode of propagation will have its own unique frequency spectrum, represented by $h(\omega)$. To estimate the Stoneley wave frequency spectrum for each one of the p propagation modes from signals which would be detected at the n-th receiver position, it is possible to "forward" or "reverse" propagate these wave modes to each individual receiver position in the array from any other individual receiver position in the array, by using the respective values of slowness for each one of the p Stoneley wave propagation modes. The slownesses can be determined by using the moveout, as shown in the graphs in FIGS. 2 and 3. Other method of determining slowness are known in the art. See for example U.S. Pat. No. 5,541,890 issued to Tang.

Propagation of one of the wave modes, $h_r(\omega)$ from receiver position n to receiver position m can be calculated by the expression: $h_r(\omega) Z_r^{m-n}$, where $Z=\exp(i\omega s_r d)$. $s_r$ represents the slowness of the r-th wave propagation mode. m represents a receiver position index for the "propagated to" receiver position, and can be smaller than, equal to, or greater than the index number n of the receiver position of interest (the "propagated from" receiver position). It is then possible to equate the sum of the propagated frequency spectra to the frequency spectra of the measured signals at each receiver position. This results in the expression:

$$n\text{th row} \rightarrow \begin{bmatrix} Z_1^{1-n} & Z_2^{1-n} & \cdots & Z_p^{1-n} \\ \cdot & \cdot & & \cdot \\ \cdot & \cdot & & \cdot \\ Z_1^0 & Z_2^0 & \cdots & Z_p^0 \\ \cdot & \cdot & & \cdot \\ \cdot & \cdot & & \cdot \\ Z_1^{N-n} & Z_2^{N-n} & \cdots & Z_p^{N-n} \end{bmatrix} \begin{bmatrix} h_1(\omega) \\ h_2(\omega) \\ \cdot \\ \cdot \\ h_p(\omega) \end{bmatrix}_n = \begin{bmatrix} W_1(\omega) \\ W_2(\omega) \\ \cdot \\ \cdot \\ W_N(\omega) \end{bmatrix} \quad [1]$$

A typical array acoustic well logging instrument which generates signals useful in the method of this invention is described, for example, in a sales brochure entitled, *Multipole Array Acoustilog*, Western Atlas Logging Services, Houston, Tex. (1993). The array acoustic well logging instrument described in this reference includes a compressional transmitter and eight compressional receivers. Because the number of receivers in the receiver array, N, of this typical array acoustic logging instrument is greater than the number of propagation modes p, equation (1) can be solved by using a least-squares method for each frequency to obtain the estimated spectra (h) for each propagation mode at the receiver position n. Transforming the resulting frequency spectra into the time domain provides the signal waveform which would obtain for each one of the p wave propagation modes.

Referring once again to FIG. 2, the significance of the moveout 32 associated with the directly propagated waves is that this moveout will represent substantially the same velocity as the moveout 34 of the events 22B–30B present in the waves reflected from the boundary below the instrument. The reflected waves can be separated from the directly propagated waves by using the single receiver moveout technique as shown in FIG. 3, where the moveout value for the directly propagated waves will be substantially equal to zero. It should also be noted that if the acoustic logging instrument configuration is reversed from that shown in FIG. 1, where the transmitter is located above the receivers, then the moveout resulting from waves reflected from boundaries above and below the instrument will be reversed in direction from those moveouts as shown in FIGS. 2 and 3. The principle of wave separation is identical in either case. Separation of directly propagated wave components from reflected wave components is shown in the flow chart of FIG. 6 at 64.

2. Stoneley Wave Simulation by the Propagator Matrix Method

The next part of the method of the invention is to simulate Stoneley waves propagating within a wellbore having an irregular wall surface, and through formations having heterogenous acoustic propagation characteristics. The simulation method which will be explained herein allows the wellbore wall surface and the formation acoustic propagation characteristics to be selected and varied arbitrarily. Actual well log instrument measurements of the acoustic propagation characteristics and of the diameter of the wellbore can be used as inputs to this simulation method. The output of the simulation method is a data set representing Stoneley wave amplitude and phase variation due to wellbore diameter variations and due to changes in the formation acoustic propagation characteristics along the Stoneley wave propagation path.

Figure 4:
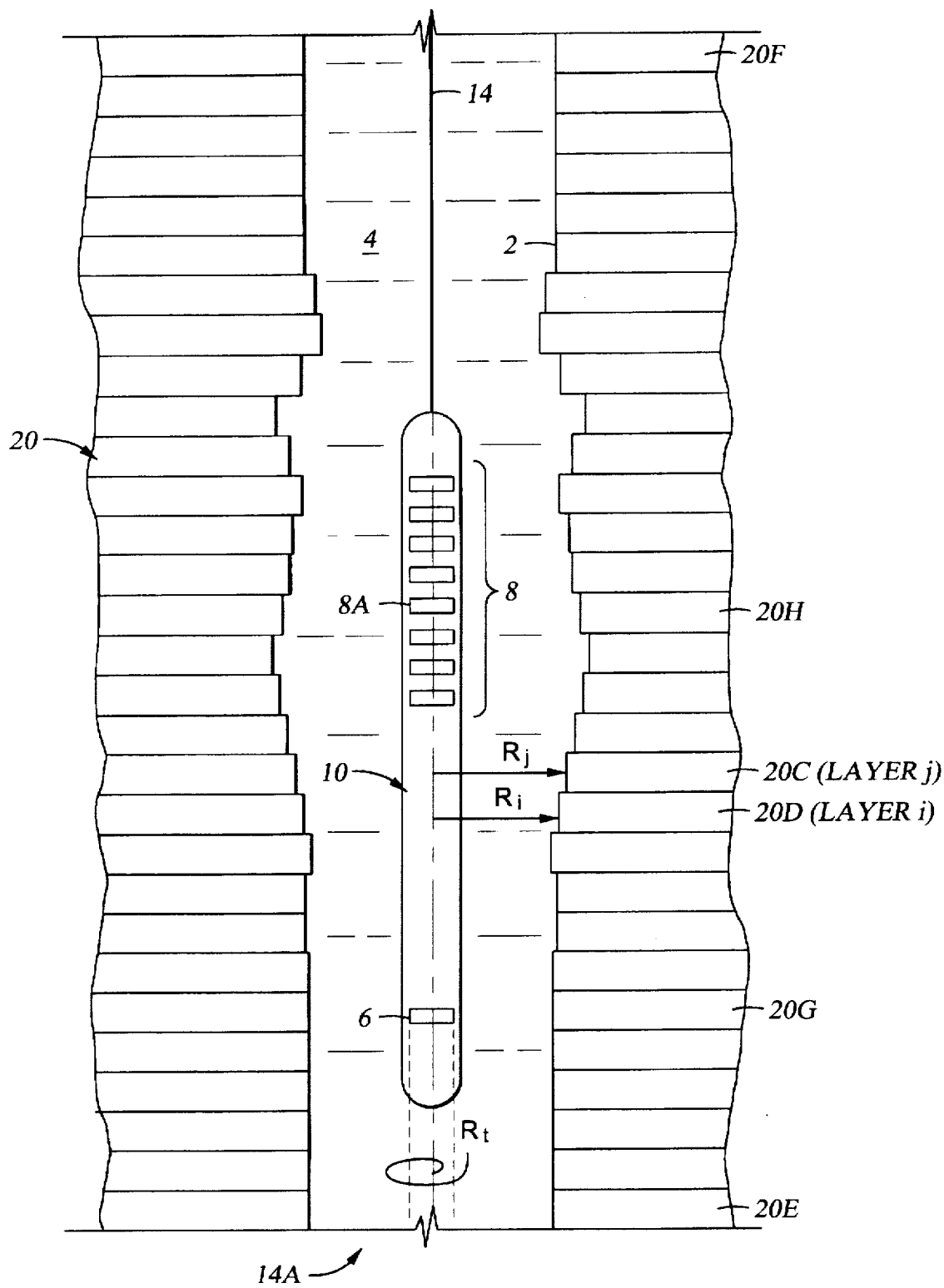
FIG. 4 shows a representation of layers of earth formation used for a method of simulating Stoneley wave propagation through the earth formations.

Referring now to FIG. 4, the wellbore 2 wall and the surrounding earth formations 20 can be divided, or "discretized", into a "stack" of thin, individual layers, such as the ones shown at 20C and 20D. The wall of the wellbore 2 need not be smooth, and in fact can be of irregular shape, as represented by the different radius of each individual layer 20C, 20D. In FIG. 4, the radius of the wellbore 2 at the axial position of layers 20C and 20D is represented by $R_j$ and $R_i$, respectively. Radii $R_j$ and $R_i$ are shown extending from the central axis 14A of the wellbore 2, outwardly to the portion of the wellbore wall corresponding to each layer 20C, 20D. The acoustic well logging instrument 10 is shown as being substantially centered in the wellbore 2.

Each layer used in the model shown in FIG. 4 represents a depth interval (an axial span along the wellbore 2), which as a matter of convenience can be set equal to the well logging instrument 10 data sample interval (typically ¼ or ½ foot as previously explained). The wellbore 2 diameter (or radius) at each layer 20C, 20D, and the layer's elastic properties can be taken directly from measurements of acoustic log properties and a caliper log. The elastic properties include the compressional and the shear velocities, which can be measured using an acoustic well logging instrument such as one described in the *Multipole Array Acoustilog* reference, supra. The well log data needed to calculate the elastic properties should also include the bulk density of each formation layer. The effect on Stoneley wave propagation of the presence of the logging instrument 10 inside the wellbore 2 can be determined by using a method described in X. Tang et al, *The Effects of a Logging Tool on the Stoneley Wave Propagation on Elastic and Porous Media*, The Log Analyst, vol. 34 pp 46–56, Society of Professional Well Log Analysts, Houston, Tex. (1993).

Stoneley wave propagation is simulated using a propagator matrix method, wherein matrix elements describe the coupling of Stoneley waves across the layers, each layer having a different wellbore radius and different acoustic propagation characteristics. In the propagator matrix method, $(b^+ \ b^-)^T$ can represent a vector containing both up-going (+) and down-going (−) Stoneley wave amplitude coefficients. The propagation of the amplitude coefficient vector from an axial (wellbore depth) position represented by $z_1$, through some of the formation layers to another axial (wellbore depth) position, represented by $z_2$, can be described by the equation:

$$\begin{pmatrix} b^+ \\ b^- \end{pmatrix}_{z_2} = \left( \prod_{l=1}^{L} G_l \right) \begin{pmatrix} b^+ \\ b^- \end{pmatrix}_{z_1} \quad [2]$$

where L represents the number of formation layers located between axial (depth) positions $z_1$, and $z_2$. The propagator matrix for the l-th layer can be derived using a method described in S. Gelinsky et al, *Modeling of Stoneley Waves in a Heterogeneous Formation With an Irregular Borehole*, 59th Annual Conference EAEG, Geneva Switzerland (1997). The propagator matrix can be described by the expression:

$$G_l = \begin{bmatrix} \dfrac{Q_l + Q'_l}{2W_{l-1}} e^{i(k_l - k_{l-1})z_l} & \dfrac{Q_l - Q'_l}{2W_{l-1}} e^{-i(k_l + k_{l-1})z_l} \\ \dfrac{Q_l - Q'_l}{2W_{l-1}} e^{i(k_l + k_{l-1})z_l} & \dfrac{Q_l + Q'_l}{2W_{l-1}} e^{-i(k_l - k_{l-1})z_l} \end{bmatrix} \quad [3]$$

where $z_l$ represents the axial (depth) position of the l-th earth formation layer and $k_{l-1}$ and $k_l$ represent the Stoneley wavenumbers of the (l-1)-th and l-th formation layers, respectively. $Q_l$ and $Q'_l$ can be computed by an integral expression I(i, j), wherein:

$$Q_l = I(l, l-1); \ Q'_l = I(l-1, l); \ W_{l-1} = I(l-1, l-1) \quad [4]$$

Integral expression I(i, j) is based on an orthogonality relation. This relation is described for example, L. Tsang, *Transient Acoustic Waves in a Fluid-Filled Borehole With Horizontal Bed Boundary Separating Two Solid Formations*, Journal of the Acoustical Society of America, vol. 81, pp. 844–853 (1987). The orthogonality relation described in the Tsang reference connects wave-induced stresses and displacements across a boundary between adjacent earth formation layers i (shown as 20C in FIG. 5) and j (shown as 20D in FIG. 5). The method for calculating the integral expression I(i, j) will be further explained.

The radius of the well logging instrument 10 and the wellbore radius in the i-th and j-th layers can be represented by $R_t$, $R_i$ and $R_j$, respectively. $\sigma_z$, $\sigma_{rz}$, $u_z$, and $u_r$, respectively, represent the Stoneley wave-induced axial normal stress, the axial-to-radial shear stress, the axial displacement, and the radial displacement. The functional forms of these quantities are described, for example, in C. Cheng et al, *Elastic Wave Propagation in a Fluid-Filled Borehole and Synthetic Acoustic Logs*, Geophysics, vol. 87, pp. 5477–5484, Society of Exploration Geophysicists (1981). Assuming for purposes of this explanation that the Stoneley wave propagates from layer i (20C in FIG. 4) to layer j (20D in FIG. 4), the expression for calculating the integral expressions I(i, j) and I(j, i) should take into account two situations, the first being that $R_i > R_j$, and the second being that $R_i < R_j$.

For first the case, where $R_i > R_j$, the following expression applies:

$$I^a(i, j) = \dfrac{(R_t^2 - R_j^2)}{(R_j^2 - R_t^2)} \int_{R_t}^{R_j} \sigma_z^{(i)} u_z^{(j)} r \, dr + \int_{R_j}^{R_i} \sigma_z^{(i)} u_z^{(j)} r \, dr + \int_{R_i}^{\infty} [\sigma_z^{(i)} u_z^{(j)} - \sigma_{rz}^{(i)} u_r^{(j)}] r \, dr \quad [5]$$

For the second case, where $R_i < R_j$, the following expression applies:

$$I^b(i, j) = \int_{R_t}^{R_i} \sigma_z^{(i)} u_z^{(j)} r \, dr + \int_{R_i}^{R_j} [\sigma_z^{(i)} u_z^{(j)} - \sigma_{rz}^{(i)} u_r^{(j)}] r \, dr + \quad [6]$$

-continued $$\int_{R_i}^{\infty} [\sigma_z^{(i)} u_z^{(j)} - \sigma_{rz}^{(i)} u_r^{(j)}] r dr$$

where subscript f denotes that the quantity is defined as being located within the liquid (shown as 4 in FIG. 4) in the wellbore (2 in FIG. 4). The corresponding I(j, i) integrals can be obtained by exchanging the indices i and j within I(i, j). For example, integral expression $I^a(j, i)$ can be obtained in this way from $I^b(j, i)$, and vice versa. When the radius of the wellbore 2 is different from one layer to the next layer, a mass conservation method such as described in K. Tezuka et al, *Modeling of Low-Frequency Stoneley Wave Propagation in an Irregular Borehole*, Expanded Abstracts, 64th Annual Meeting, Society of Exploration Geophysicists (1994) can be used to account for the difference in radius on the propagation of the Stoneley waves. This method normalizes the axial fluid displacement for the individual layer having the larger wellbore radius. More specifically, for the case where $R_i > R_j$, the first integral in $I^a(i, j)$ is multiplied by the expression $[(R_i^2 - R_t^2)/(R_j^2 - R_t^2)]$. Correspondingly, for the case where $R_j > R_i$, the first integral in $I^a(i, j)$ is multiplied by the expression $[(R_j^2 - R_t^2)/(R_i^2 - R_t^2)]$. These expressions, or "normalization factors", represent the ratio of areas in the liquid 4 in the wellbore 2 between layer i 20C and layer j 20D.

The I(i, j) term in equation (4) can then be calculated using equation (5) or (6). For the case i=j=l−1 (representing the same individual layer), either equation (5) or (6) can be used to calculate the expected received signal $W_{l-1}$. For the case where $R_i > R_j$, equation (6) can be used to calculate $Q_1 = I^b(l, l-1)$, and equation (5) can be used to calculate $Q_1' = I^a(l, l-1)$. For the case where $R_j > R_i$, equation (6) can be used to calculate $Q_1' = I^b(l-1, l)$, and equation (5) can be used to calculate $Q_1 = I^a(l, l-1)$. All these integral expressions have closed form analytical solutions, which can be calculated by using an appropriate computer program in order to provide fast simulation of Stoneley wave propagation across the layers of the earth formations.

A procedure to implement the simulation method just described to Stoneley wave propagation through actual earth formations will now be explained. Referring once again to FIG. 4, consider the acoustic instrument 10 as being positioned within the stack of formation layers. In the simulation method, the length (equivalent to the axial or wellbore depth extent) of the stack is set so that Stoneley wave reflections from the upper and lower ends of the stack will occur at times after end of the time window of acoustic signal measurement. For the typical logging instrument this time window is about 4 to 5 milliseconds (4,000 to 5,000 microseconds) from the time of actuation of the source 6. Since the Stoneley wave velocity through the layers for which the simulation is being run is known or can be determined from the measured acoustic signals, a stack length can be selected which will have a simulated reflected wave travel time calculated to cause the reflected Stoneley waves to arrive after the end of the recording time window. The stack length, therefore, is typically only a few feet long.

For any selected set of simulation calculations according to this method, the source 6 would be positioned in the wellbore 2 adjacent to one particular layer, such as shown at 20G and referred to hereinafter as the "source layer", hsr and h can denote, respectively, the product matrix from the upper boundary of the source layer 20G to a layer 20H in which a centrally positioned receiver 8A in the array of receivers 8 is located (this layer being referred to as the "receiver layer"), and the product matrix to the upper end 20F of the stack. hb can denote the product matrix from the lower boundary of the source layer 20G to the lower end 20E of the stack of layers. The synthetic propagation of a Stoneley wave emitted from the source 6 positioned in the wellbore 2 adjacent to the source layer 20G is completely described by the product matrices hsr, h, and hb. This can be better understood from the following analysis.

With respect to the source layer 20G, the Stoneley wave amplitude coefficient vectors at the upper boundary and at the lower boundary of each layer (in this case the source layer 20G) are related to excitation caused by the source 6 according to the expression:

$$\begin{pmatrix} b^+ \\ b^- \end{pmatrix}_{upper} - \begin{pmatrix} b^+ \\ b^- \end{pmatrix}_{lower} = \frac{S(\omega)}{ik_s} \begin{pmatrix} e^{-ik_s d_s} \\ -e^{ik_s d_s} \end{pmatrix} \quad [7]$$

where $k_s$ represents the source layer 20G Stoneley wavenumber and $d_s$ represents the distance between the source 6 (the transmitter) and the lower boundary of the source layer 20G. $S(\omega)$ represents the Fourier spectrum of the energy output of the source 6. The amplitude coefficient vector at the upper boundary of the source layer 20G, from equation (7), can be propagated to the upper end 20F of the stack of layers by using the expression for h, and the source layer 20G lower boundary amplitude coefficient vector can be propagated to the lower end 20E of the stack using the expression for hb. Using boundary conditions which may be specified for the two ends 20E, 20F of the stack, plus equation (7) is sufficient to determine the two Stoneley wave amplitude coefficient vectors in equation (7). Then by propagating the amplitude coefficient vectors from the source 6 position to the central receiver 8A position using hsr provides the propagated Stoneley wave signal which would obtain at the central receiver 8A position.

Figure 5:
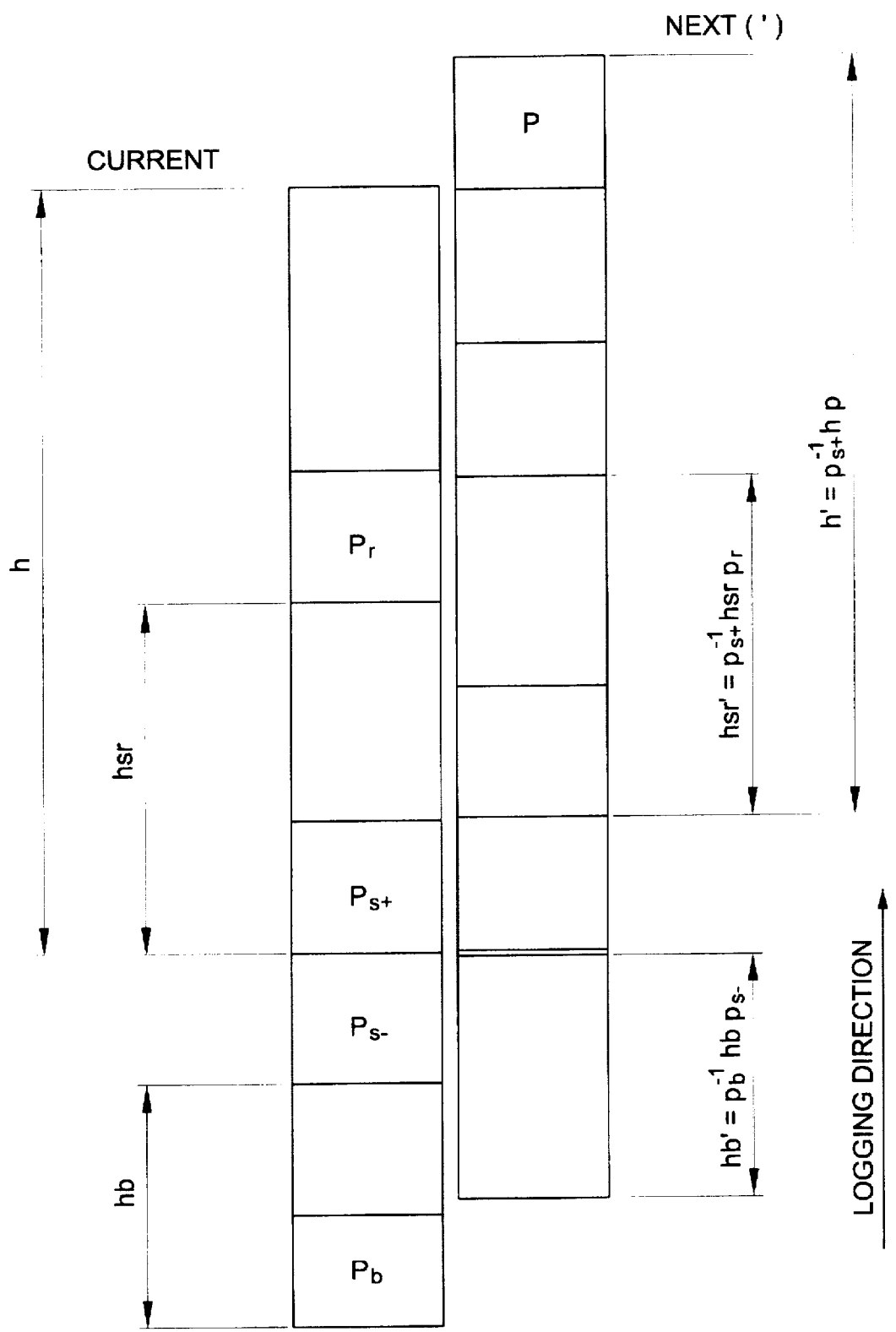
FIG. 5 shows a diagram of propagation vectors used to update the Stoneley wave simulation as the logging instrument is moved through the wellbore.

To simulate the logging process of an acoustic well logging instrument in an actual wellbore, the procedure just described can be repeated for a plurality of consecutive source 6 positions. This can be described as a solution to the following problem: given hsr, h, and hb, how can these matrices be updated to obtain corresponding matrices hsr',h', and hb' when the source layer is moved into the next layer within the earth formation. The updating can be performed by calculating the propagator matrix (from equation (3)) adjacent to the top end of the current model stack (see FIG. 4), and denote the resulting matrix by p. The new matrices can be updated according to the expressions:

$$h' = p_{s+}^{-1} hp; \quad hsr' = p_{s+}^{-1} hsr\, p_r; \quad hb' = p_b^{-1}\, hb\, p_{s-} \quad [8]$$

where $p_{s-}$, $p_{s+}$, $p_r$ and $p_b$ represent the propagator matrix at the source layer 20G, the layer on top of the source layer, the receiver layer 20H, and the lowermost layer of the stack, respectively. These matrices have already been calculated for previous depth positions of the logging instrument. The updating scheme is illustrated in FIG. 5. Once hsr', h', and hb' have been determined, the Stoneley wave propagation for the new source position is completely determined.

Since the simulated Stoneley waves will include both directly propagated and reflected wave components, the simulated Stoneley waves can also be gathered into common source gathers, such as shown in FIG. 2 and into common offset gathers, such as shown in FIG. 3, for the purpose of applying the wave separation method of equation (1). The simulated Stoneley waves can then be split into directly propagated, up-going and down-going simulated Stoneley waves, just as was done for the measured Stoneley waves.

The directly propagated synthetic Stoneley waves are preferably used in the permeability analysis which will be explained below. Synthesis of Stoneley waves using the propagator matrix method is shown in the flow chart in FIG. 6 at 66.

3. Permeability Indication

Indication of permeable earth formations can be useful even without quantitative determination of the permeability. Permeability indication can be performed by comparing the measured Stoneley wave data derived from the wave separation processing described previously herein with the numerical simulation of the Stoneley waves just described. By simulating the elastic wave propagation effects of the actual earth formations penetrated by the wellbore, any effects on the Stoneley waves which are not related to the permeability can be accounted for. Then, the differences between the measured and simulated Stoneley waves will mainly reflect the permeability effects.

First, a "reference" formation layer, in which the permeability is known (which can also include zones known to be impermeable) is selected. Then a synthetic waveform "log", representing a synthetic Stoneley waveform for each axial position in the wellbore, can be calculated using the expression:

$$W_{syn}(f, z) = M(f, z) \left[ \frac{W(f, z_r)}{M(f, z_r)} \right] \quad [9]$$

where M represents the synthetic Stoneley wave spectral response (or transfer function) directly along the wave propagation path. The response of the measured Stoneley wave signals, as previously explained, can be obtained through wave separation. W represents the spectrum of the measured Stoneley wave signals. The spectral ratio in equation (9) represents a source (excitation) spectrum, obtained by deconvolving the propagation transfer function from the measured wave at the reference position $z_r$. Then, convolving the source spectrum with the transfer function at any depth (axial) position z will generate the synthetic Stoneley wave at that depth.

For a given wave spectrum (synthetic or measured), the wave center frequency and the variance of the spectrum can be calculated using the expressions:

$$f_c = \int f W(f) df / \int W(f) df$$

$$\sigma^2 = \int (f-f_c)^2 W(f) df / \int W(f) df \quad [10]$$

A center time can be computed from the waveform of W using the expression:

$$T_c = \int t [W(t)]^2 dt / \int [W(t)]^2 dt \quad [11]$$

The frequency shift and travel-time delay between the measured wave and synthetic wave can be defined by the expressions:

$$\Delta f_c = f_c^{synthetic} - f_c^{measured}$$

$$\Delta T_c = T_c^{measured} - T_c^{synthetic} \quad [12]$$

Alternatively, the time delay, $\Delta T_c$, can be calculated using a cross-correlation method, where the delay is determined as the value for time shift of the measured wave required to maximize the degree of correspondence (correlation) between the measured wave and the synthetic wave.

A theory known in the art for Stoneley wave propagation in a permeable borehole indicates that permeability has two direct effects on the Stoneley wave, these being an increase in wave attenuation and decrease in the wave speed. The first effect is characterized by the frequency shift, while the second is characterized by the travel-time delay. Therefore, these two quantities can be used to indicate formation permeability. For example, if the frequency shift corresponds to the travel-time delay within a particular depth interval, it is very likely that these effects are indicative of formation permeability. A formation exhibiting these Stoneley wave properties can thus be characterized as a permeable formation. Indication of a permeable formation by comparing synthetic Stoneley waves to measured Stoneley waves is shown in the flow chart of FIG. 6 at 68.

4. Permeability Inversion Processing

Quantitative estimation of permeability can be performed using a fast model theory such as described in X. Tang et al, *Dynamic Permeability and Borehole Stoneley Waves: a Simplified Biot-Rosenbaum Model* Journal of the Acoustical Society of America, vol. 90, pp. 1632–1646 (1991) and an inversion process such as one described in R. Chunduru et al, *2-D Resistivity Inversion Using Spline Paramerterization and Simulated Annealing*, Geophysics, vol. 61, pp. 151–161, Society of Exploration Geophysicists (1996). The Stoneley wave attenuation due to the fluid in the wellbore and due to the intrinsic attenuation of the earth formations is also estimated, because the intrinsic attenuation also affects the Stoneley wave attenuation and the Stoneley wave travel time. As compared to the effects caused by permeability, the intrinsic attenuation has a different frequency dependency and a different effect on wave attenuation and travel time. This enables these factors to be simultaneously estimated along with the permeability. Including intrinsic attenuation in the inversion procedure allows accounting for the non-permeability related effects on Stoneley wave propagation through the wellbore and earth formations.

Within a permeable earth formation, the Stoneley wavenumber k can be determined by the expression:

$$k = \sqrt{k_0^2 + \frac{2iR\rho\omega\kappa(\omega)}{(R^2-R_t^2)\mu} \gamma\sqrt{\frac{-i\omega}{D}} \frac{K_1(R\sqrt{-i\omega/D+k_0^2})}{K_0(R\sqrt{-i\omega/D+k_0^2})}} \quad [13]$$

$$D = \frac{\kappa(\omega)\rho_0 V_0^2}{\phi\mu(1+\zeta)}$$

where $K_n$ (n=0, 1) represents a modified Bessel function of the second kind of order n, R represents the wellbore radius in the permeable formation and $R_t$ represents the well logging instrument radius. $\mu$, $\rho_0$ and $v_0$ represent, respectively, the viscosity of the fluid in pore spaces of the permeable formation, the density of this fluid, and its Stoneley wave velocity. $\phi$ represents the fractional volume of pore space of the permeable formation (called "porosity"). $\gamma$ represents a correction factor which is related to the permeable formation's shear wave velocity. $\zeta$ represents a correction factor which is related to the compressibility of the solid rock portion of the permeable formation (referred to in the art as the "matrix"). The correction factor can be calculated if the compressional velocity and the shear wave velocity, the porosity, and the density of the earth formation are known (see the Tang et al 1991 reference, supra). $\kappa(\omega)$ represents the dynamic permeability (see for example, D. Johnson et al, *Theory of Dynamic Permeability and Tortuosity in Fluid-Saturated Porous Media*, Journal of Fluid Mechanics, vol. 176, pp. 379–400 (1987)), which can be calculated by the expression:

$$\kappa(\omega) = \frac{\kappa_0}{(1 - i\kappa_0\rho_0\omega/2\mu\phi)^{1/2} - i\kappa_0\rho_0\omega/\mu\phi} \quad [14]$$

where $\kappa_0$ represents the quantitative formation permeability. Wavenumber $k_0$ in equation (14) corresponds to an equivalent elastic formation whose properties are similar to those of the fluid saturated earth formation. The X. Tang et al 1993 reference describes a method for calculating the wavenumber $k_0$ in the permeable formation when the well logging instrument 10 is present in the wellbore 2.

The effect of the intrinsic attenuation can be accounted for by a transformation described in Cheng et al, *Determination of In-Situ Attenuation from Full Waveform Acoustic Logs*, Journal of Geophysical Research, vol. 87, pp. 5477–5484 (1982). This transformation can be expressed as:

$$k(\kappa_0, 1/Q) \to k(\kappa_0)\left(1 + \frac{i}{2Q}\right)\left(1 + \frac{1}{(\pi Q)} \ln|f/f_0|\right) \quad [15]$$

where $f_0$ represents an arbitrary reference frequency, which can be the Stoneley wave center frequency. Q represents the quality factor; 1/Q represents the attenuation, which is mostly caused by the liquid 4 in the wellbore 2, but is partially caused by the permeable formation itself.

With this theoretical model, the theoretical center frequency and theoretical frequency variance of the Stoneley waves can be calculated using the expressions:

$$f_c^{th} = \int f P W^{sym}(f) |e^{ikd}| df / \int P W^{sym}(f) |e^{ikd}| df$$

$$\sigma_{th}^2 = \int (f - f_c^{th})^2 P W^{sym}(f) |e^{ikd}| df / \int P W^{sym}(f) |e^{ikd}| df \quad [16]$$

where P represents the excitation reduction due to the formation permeability, which can be calculated as $P = k_0/k$ (See X. Tang et al, *The Effects of a Logging Tool on the Stoneley Waves Propagation in Elastic and Porous Formations*, The Log Analyst, vol. 34, pp. 46–56, Society of Professional Well Log Analysts, Houston, Tex., 1993). d in this expression represents the Stoneley wave travel distance and $e^{ikd}$ represents the amplitude decay caused by permeability and by attenuation along the wave propagation path. In equation (16), the theoretical frequency shift is defined as:

$$\Delta f_c^{th} = f_c^{sym} - f_c^{th} \quad [17]$$

The theoretical travel-time delay can be computed using the expression:

$$\Delta T_c^{th} = \frac{\int (k_0 d/\omega - kd/\omega) W^{sym}(f) df}{\int W^{sym}(f) df} \quad [18]$$

Equations (17) and (18) provide the overall frequency shift and travel-time delay of Stoneley waves in a permeable and attenuating wellbore relative to an impermeable and nonattenuating wellbore. Although the travel-time delay is calculated in the frequency domain, it can be shown that this delay is equivalent to the time delay computed directly in the time domain using the method of equations (11) and (12).

By comparing the measured frequency shift and travel-time delay given by equation (12), with the theoretical predictions given by equations (17) and (18), an inverse problem can be formulated, with the intended result of minimizing the following objective function:

where $\sigma^2_{syn}$ and $\sigma^2_{th}$ can be computed from equations (10) and (16), respectively. The $$E(\kappa_0, 1/Q) = (\Delta f_c^{meas} - \Delta f_c^{theor})^2/\sigma_{synth}^2 + 2\pi\sigma^2_{synth}(\Delta T_c^{meas} - \Delta T_c^{theor})^2 + \alpha(\sigma^2_{synth} - \sigma^2_{theor})^2 \quad [19]$$

first and second terms are so scaled that the frequency shift and travel-time delay have almost equal importance in the objective function. The third term in the objective function is a penalty function related to the differences in variance between the synthetic Stoneley waves' spectral distribution (calculated using equation (10)) and the measured Stoneley waves' spectral distribution (calculated using equation(18)). The coefficient $\alpha$ is typically very small, so that this term in equation (19) has almost zero contribution in the inversion if the values of the parameters vary only within a range of values likely to be encountered in real earth formations. If the values of $\kappa_0$ and 1/Q are very large, the third term of equation (19) becomes large also, which drives the inversion parameters back into the expected range of values.

The inversion process can use any appropriate minimization algorithm, including well known local algorithms such as conjugate gradient and Levenberger-Marquardt. The inversion can also use global minimization algorithms such as simulated annealing. See for example L. Ingber, *Very Fast Simulated Reannealing*, Mathematical Computing, vol. 12, pp. 967–973 (1989) and R. Chunduru et al., *2-D Resistivity Inversion Using Spline Parameterization and Simulated Annealing*, Geophysics, vol. 61, pp. 151–161, Society of Exploration Geophysicists (1996). The local minimization algorithms require assigning initial values for the model parameters. The initial values can be selected using simulation results prom the previously processed axial position (wellbore depth). The global algorithms do not need initial values, but may require somewhat longer computational time to complete the inversion. Calculating permeability by inversion processing is shown in the flow chart in FIG. 6 at 70.

5. Improving Axial Resolution

In the previously described inversion process, the permeability effect which is calculated typically represents the average value within an axial span comprising a distance from the source (6 in FIG. 4) to the centrally located receiver (8A in FIG. 4) in the receiver array, typically about 10 to 13 ft. The features in the processed Stoneley wave data, however, usually have an axial resolution of about the aperture of the receiver array (8 in FIG. 1), typically about 3 to 4 ft. With the process to be described below, the permeability can be estimated to an axial resolution of about equal to the receiver array aperture.

The wave travel distance d (representing the distance between the source 6 to the center receiver 8A in the array 8) can be divided into two parts:

$$d = d_0 + d' \quad [20]$$

where d' represents a distance equal to the array aperture, this being measured from the center of the receiver array 8 to the source 6. $d_0$ represents the remaining distance linking to the source 6. Assuming that the theoretical travel time delay and frequency shift over $d_0$ are known from previous estimates, then the theoretical travel time delay and frequency shift over $d_0$ can be subtracted from the measured time delay and frequency shift using the expression:

$$\Delta f_c^{meas} \to f_c^{meas} - f_c^{th}(d_0)$$

$$T_c^{meas} \to T_c^{meas} - T_c^{th}(d_0) \quad [21]$$

Then d' can be used in substitution of d in Equations (17) and (19) for calculating the theoretical frequency shift and time delay. Finally, the calculated quantities and the modified data can be used in the inversion formulation [from equation (20)] to estimate the permeability over the reduced distance d'.

After the permeability over the reduced distance d' is estimated, the theoretical frequency shift and time delay over the reduced distance d' can be calculated. These quantities are combined with those of the previous instrument axial positions (depths) to provide a new average of the quantities over the distance $d_0$, for estimating permeability in the next depth interval. This scheme is repeated over the entire processing interval.

6. Fluid Parameter Calibration

By performing an asymptotic analysis of the model theory given in equation (14), it has been determined that the permeability-induced time delay and frequency shift are affected by the following parameter combination (in addition to the formation porosity, and wellbore and instrument radii):

$$\frac{\kappa_0}{\mu B_0^{1/2}}, \quad (B_0 = \rho_0 V_0^2) \quad [22]$$

where $B_0$ represents the pore fluid bulk modulus or "incompressibility". This asymptotic analysis is valid for most permeability values of typically earth formations and for the Stoneley wave frequency range used in this invention, of about 1 kHz. This parameter combination indicates that formation pore fluid parameters such as fluid viscosity, density, and acoustic travel speed, must be determined to calculate the permeability quantitatively. The pore fluid parameters, however, may be difficult to determine if multiple fluids are present in the pore spaces of the formations and the fractional composition of these multiple fluids is unknown. In the invention, a calibration method is used to determine a useful value for these parameters.

The calibration method consists of selecting a few (a minimum of two) depth intervals whose permeability values have been estimated from other measurements (including, but not limited to such measurements as gas flow in core samples, formation fluid pressure tests, nuclear magnetic resonance (NMR) well logs). By choosing one of these depths as reference depths for equation (9), synthetic Stoneley wave data can be computed for the remaining depths. This process (i.e., reference selection and modeling) is rotated for all the depths. Then, by comparing the synthetic data with the measured data, we can estimate $\mu B_0^{1/2}$ by minimizing the following misfit function:

$$F(\mu B_0^{1/2}) = \quad [23]$$

$$\sum_{\substack{i,j=1 \\ (i \neq j)}}^{n} \{(\Delta f_c^{mud} - \Delta f_c^{th})^2/\sigma_{syn}^2 + 2\pi\sigma_{syn}^2(\Delta T_c^{mud} - \Delta T_c^{th})^2\}_{i,j}$$

where n represents the total number of depths chosen and the pair i, j indicates using depth position i as the reference to compare with depth j. In the minimization, the known permeability values at the calibration depths are used as a known parameter in the parameter combination described above. Only $\mu B_0^{1/2}$ is varied as the fitting parameter. The value of this parameter that minimizes the value of the misfit function in equation (23) is determined to be the desired fluid parameter value for the depth zone of interest. This fluid parameter value can be used to estimate a continuous permeability over the entire zone of interest.

Those skilled in the art will devise other embodiments of this invention which do not depart from the spirit of the invention as disclosed herein. Accordingly, the invention should be limited in scope only by the attached claims.

What is claimed is:

1. A method for determining permeability of earth formations penetrated by a wellbore from acoustic signals measured by an acoustic wellbore logging instrument, comprising:

separating components from said acoustic signals representing Stoneley waves propagating through said earth formations;

synthesizing signals representing the entire Stoneley waves propagating through said earth formations in the absence of permeability related effects by use of a propagating matrix;

comparing said separated acoustic signal components and said synthesized Stoneley wave signals; and calculating said permeability from differences between said synthesized Stoneley wave signals and said separated acoustic signal components.

2. The method as defined in claim 1 wherein said step of calculating said permeability comprises inversion processing wave center frequency shift and travel time delay with respect to said permeability of said earth formations.

3. The method as defined in claim 1 further comprising calibrating said permeability with respect to mechanical properties of a fluid in pore spaces of said earth formations by performing said steps of separating, synthesizing, comparing and calculating within a zone having known permeability.

4. The method as defined in claim 1 further comprising enhancing an axial resolution of said step of calculating said permeability, comprising:

dividing an acoustic wave travel distance into a first part and a second part, said first part having a known theoretical travel time and frequency shift determined from said permeability;

subtracting said known theoretical travel time and frequency shift of said first part from said wave travel distance;

using a result of said subtracting to calculate a theoretical frequency shift and a theoretical travel time for said second part; and calculating said permeability for said second part.

5. The method as defined in claim 1 wherein said step of separating comprises:

determining a frequency spectrum of portions of said separated components representing said Stoneley waves propagating directly from an acoustic transmitter to an acoustic receiver on said logging instrument;

determining a frequency spectrum of portions of said components representing Stoneley waves reflected from acoustic wave boundaries within said earth formations; and separating said directly propagated portion spectrum from said reflected portion spectrum by synthetically propagating said directly propagated portion spectrum and said reflected portion spectrum from a first acoustic receiver location to a second receiver location, and equating a sum of said directly propagated spectrum and said reflected portion spectrum with a measured wave spectrum from said second receiver location.

6. The method as defined in claim 1 wherein said step of separating said components comprises identifying and separating portions of said Stoneley waves propagated directly from an acoustic source to an acoustic receiver on said logging instrument.

7. The method as defined in claim 1 wherein said step of synthesizing comprises generating a propagator matrix including Stoneley wave amplitude coefficients for layers of said earth formations proximal to said logging instrument, and wherein said amplitude coefficients correspond to elastic properties and a wellbore diameter for each of said layers.

8. The method as defined in claim 7 wherein said elastic properties comprise compressional velocity, shear velocity and density.

9. The method as defined in claim 1 wherein said step of comparing said separated components and said synthesized Stoneley wave signals comprises calculating a frequency shift and a time delay for said separated components and for said synthesized Stoneley wave signals.

10. The method as defined in claim 9 further comprising determining a theoretical frequency shift and a theoretical time delay with respect to said permeability and said synthesized Stoneley waves propagating through said earth formations.

11. A method of well logging, comprising:
   inserting an acoustic wellbore logging instrument comprising an acoustic transmitter and an acoustic receiver into a wellbore drilled through earth formations;
   periodically energizing said transmitter and detecting acoustic signals at said receiver;
   separating components of said acoustic signals which represent said Stoneley waves propagating through said earth formations;
   synthesizing signals corresponding to said is Stoneley waves propagating through said earth formations in the absence of permeability related effects by use of a propagating matrix;
   comparing said separated components and said synthesized Stoneley wave signals; and
   calculating said permeability from differences between said synthesized Stoneley wave signals and said separated components.

12. The method as defined in claim 11 wherein said step of calculating said permeability comprises inversion processing wave center frequency shift and travel time delay with respect to said permeability of said earth formations.

13. The method as defined in claim 1 wherein said inversion processing is completed when a value of an objective function reaches a minimum.

14. The method as defined in claim 11 further comprising calibrating said permeability for mechanical properties of fluid in pore spaces of said formation by performing said steps of separating, synthesizing, comparing and calculating within a zone having known permeability.

15. The method as defined in claim 11 further comprising enhancing an axial resolution of said step of calculating said permeability comprising:

dividing an acoustic wave travel distance into a first part and a second part, said first part having a known theoretical travel time and frequency shift determined from said permeability;

subtracting said known theoretical travel time and frequency shift of said first part from said wave travel distance;

using a result of said subtracting to calculate a theoretical frequency shift and a theoretical travel time for said second part; and calculating said permeability for said second part.

16. The method as defined in claim 11 wherein said step of separating comprises:
   determining a frequency spectrum of portions of said separated components representing said Stoneley waves propagating directly from an acoustic transmitter to an acoustic receiver on said logging instrument;
   determining a frequency spectrum of portions of said components representing Stoneley waves reflected from acoustic wave boundaries within said earth formations; and
   separating said directly propagated portion spectrum from said reflected portion spectrum by synthetically propagating said directly propagated portion spectrum and said reflected portion spectrum from a first acoustic receiver location to a second receiver location, and equating a sum of said directly propagated spectrum and said reflected portion spectrum with a measured wave spectrum from said second receiver location.

17. The method as defined in claim 11 wherein said step of separating said components comprises identifying and separating portions of said Stoneley waves propagated directly from said acoustic source to said acoustic receiver.

18. The method as defined in claim 11 wherein said step of synthesizing comprises generating a propagator matrix including Stoneley wave amplitude coefficients for layers of said earth formations proximal to said logging instrument, and wherein said amplitude coefficients correspond to elastic properties and a wellbore diameter for each of said layers.

19. The method as defined in claim 18 wherein said elastic properties comprise compressional velocity, shear velocity and density.

20. The method as defined in claim 11 wherein said step of comparing said separated components and said synthesized Stoneley waves comprises calculating a frequency shift and a time delay for said separated components and for said synthesized Stoneley waves.

21. The method as defined in claim 20 further comprising determining a theoretical frequency shift and a theoretical time delay with respect to said permeability and said Stoneley waves propagating through said earth formations.

* * * * *